United States Patent [19]

Kiehne et al.

[11] Patent Number: 5,568,210
[45] Date of Patent: *Oct. 22, 1996

[54] ENVELOPE FOR TRANSPARENCY

[75] Inventors: Douglas A. Kiehne; Kenneth W. Luthy, both of Austin, Tex.

[73] Assignee: Minnesota Mining and Manufacturing Company, St. Paul, Minn.

[*] Notice: The term of this patent shall not extend beyond the expiration date of Pat. No. 5,237,355.

[21] Appl. No.: 330,319

[22] Filed: Oct. 27, 1994

Related U.S. Application Data

[60] Division of Ser. No. 37,307, Mar. 26, 1993, Pat. No. 5,371,560, which is a continuation-in-part of Ser. No. 959,161, Oct. 9, 1992, abandoned, which is a continuation-in-part of Ser. No. 792,717, Nov. 15, 1991, Pat. No. 5,237,355.

[51] Int. Cl.⁶ ................................................ G03B 21/11
[52] U.S. Cl. .................................. 353/120; 353/DIG. 5; 40/701
[58] Field of Search ............................ 353/120, 42, 97, 353/DIG. 3, DIG. 5; 40/152, 158, 159

[56] References Cited

U.S. PATENT DOCUMENTS

| | | | |
|---|---|---|---|
| Re. 24,906 | 12/1960 | Ulrich | 206/59 |
| 3,875,693 | 4/1975 | Pelkey | 40/124.1 |
| 4,181,752 | 1/1980 | Martens et al. | 427/54.1 |
| 4,304,705 | 12/1981 | Heilmann et al. | 260/30.4 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,402,585 | 9/1983 | Gardlund | 353/DIG. 5 |
| 4,679,923 | 7/1987 | Nielsen | 353/120 |
| 5,237,355 | 8/1993 | Kiehne et al. | 353/DIG. 5 |
| 5,266,987 | 11/1993 | Kiehne et al. | 353/120 |
| 5,371,560 | 12/1994 | Kiehne et al. | 353/DIG. 5 |

FOREIGN PATENT DOCUMENTS 382266  8/1972  Sweden .................. G03B 21/64

*Primary Examiner*—William C. Dowling
*Attorney, Agent, or Firm*—Gary L. Griswold; Walter N. Kirn; Darla P. Neaveill

[57] ABSTRACT

An improved envelope for transparencies for overhead projectors comprising a substantially rectangular pocket made of a transparent sheet material, the pocket having two longitudinal side edges connected by shorter side edges, and being open at least along one side edge for insertion of a transparency, at least one opaque flap attached in a foldable manner along one of the side edges by means of a flexible adhesive tape, the tape comprising a flexible polyester backing having a thickness of from about 5 to about 15 micrometers, and coated on one surface of the backing is an adhesive layer, wherein the tape has a flexibility measurement of about 1.8 grams, and the flap is capable of remaining in the unfolded position on an overhead projector stage with minimal adhesive transfer at the operating temperature of the overhead projector.

9 Claims, 1 Drawing Sheet

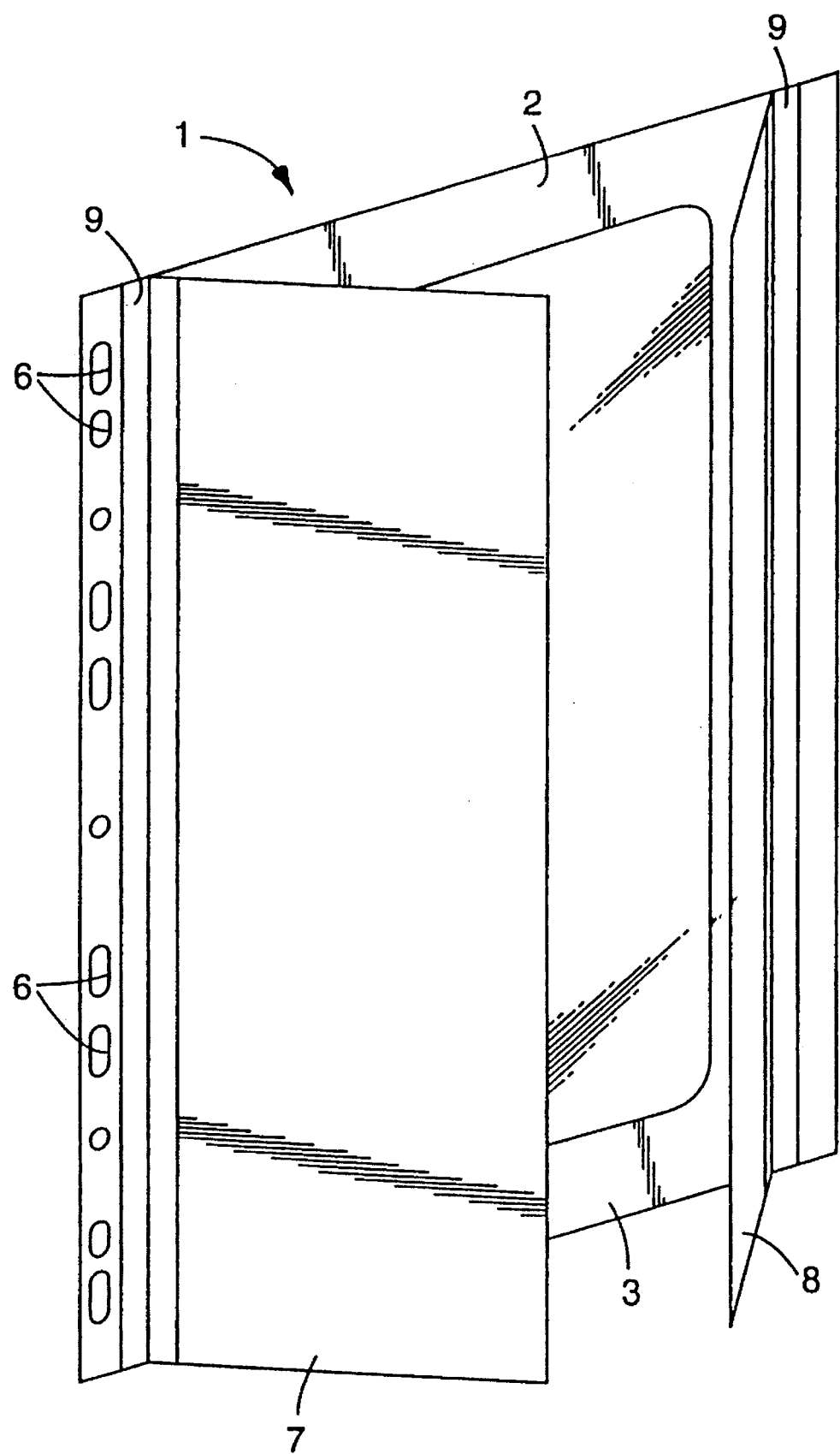

5,568,210

ENVELOPE FOR TRANSPARENCY

This application is a divisional application of U.S. application Ser. No. 08/037,307, filed Mar. 26, 1993, issued as U.S. Pat. No. 5,371,560, which is a continuation-in-part of U.S. application Ser. No. 07/959,161, filed Oct. 9, 1992, now abandoned, which is a continuation-in-part of U.S. application Ser. No. 07/792,717, filed Nov. 15, 1991, issued as U.S. Pat. No. 5,237,355.

BACKGROUND OF THE INVENTION

1. Field of the Invention

The invention relates to an envelope for holding transparencies used in overhead projectors. Specifically, the envelopes include at least one opaque flap attached to the envelope using an adhesive tape having increased flexibility.

2. Description of the Related Art

Business presentations, lectures and the like often are augmented by the use of imaged transparencies, which are exhibited to the viewers on a screen by means of an overhead projector (OHP). The individual transparencies are delicate, and easily damaged in storage or transit. Various types of covers, folders and envelopes have been provided in order to enable professional presentations, as well as interim protection of the transparencies.

U.S. Pat. No. 3,875,693 discloses the framing of a transparency in a frame made from carton, paperboard and the like. The frame is meant to mask the illumination gaps formed about the peripheral of the transparency proper. The frame can also be used to make notes or other memoranda needed by the lecturer which remain unseen by the audience. However, these frames are bulky and will not fit into standard size files, binders and shelves, being therefore difficult to store and transport. Also, they are not easily removable without destruction of the frame and attendant damage to the transparency. Finally, the frames are not convenient to attach to transparencies as each one must be carefully positioned and attached by hand.

Swedish Patent Application No. 382,266 discloses an envelope which is a plastic sheet pocket having punched holes along one side, and being open at the top for insertion of the transparency to be presented. These envelopes are removable, simple to handle, store and transport as the outer dimensions are those of standard binders or files. Moreover, the transparency is protected by the envelope and at the presentation, notes can be made on the envelope.

The disadvantage of this envelope is that peripheral illumination is not masked and the lecturer cannot make written notes on the envelopes without having these notes being shown on the screen as well. The punched holes also show an outline on the screen. Therefore, this envelope does not yield a presentation having an extremely professional appearance.

U.S. Pat. Nos. 3,253,358; 3,264,936; 3,438,702; 3,438,703; 3,524,703; 3,536,393; 3,537792; 3,544,211; 3,600,079; and Swedish Patent Application No. 346,166 describe further examples of covers or envelopes for OHP transparencies. The covers and envelopes disclosed in these publications are complicated and difficult to handle and have many drawbacks, e.g., most of these presuppose that the transparencies are to be presented in a prescribed order and the covers of most of these transparencies are difficult to remove.

U.S. Pat. No. 4,810,544 discloses another transparent sleeve comprising a transparent sheet material having a single fold dividing the sheet into two halves, and a strip of double coated adhesive tape running the length of an edge of the sheet substantially parallel to the fold. The tape is disclosed to have a low tack, reusable adhesive on the side of the tape which will adhere to the top strip. When folded, the single sheet forms a sleeve. This envelope protects the printed media, and can be stored in a binder when holes are punched along the edge, but again, any written notes or prompts will be visible on the screen.

U.S. Pat. No. 4,402,585 discloses an envelope for overhead transparencies that overcomes many of the disadvantages of the previously described envelopes. The envelope comprises a rectangular pocket formed of transparent sheet material defining opposed rectangular faces which are separable along at least one side edge for insertion of the transparency therebetween. At least one opaque flap is attached in a foldable manner along one of the longitudinal side edges of the pocket. The flap is attached to and spaced a distance from the longitudinal edge such that in the unfolded position the flap extends beyond the side edge and covers the longitudinal edge. In the folded position, the flap exposes the longitudinal side edge. Holes may be punched along the side edge of the material to permit storage of the envelope in a binder, file or the like. Preferably, the flaps are formed of a plastic material which accepts written text by conventional writing instruments.

When stored, the flaps are in the folded position, and are unfolded for use. The means of attachment must allow the flaps to stay in the unfolded position during presentation. Otherwise the flaps might tend to spring back to their folded position, which is inconvenient for the presenter, and may cover the added notes. To aid the situation, the envelope can be placed with the flaps face down on the overhead projector stage, so that the weight of the envelope and the overhead transparency can insure that the flaps stay unfolded. However, where flaps are difficult to fold, the envelope will not lay flat on the stage, which can cause focusing problems, which are especially severe when one uses a reflective type overhead projector. In addition, due to the operating temperature of the OHP and stage, the adhesive used to attach the flap can be transferred to the stage, causing unsightly spots on the screen and messy blotches on the stage which can also transfer to materials used thereafter.

The present inventors have discovered that, by using a certain combination of backing film and adhesive, the flaps can be securely attached to the transparent envelope, easily remaining in either the folded or the unfolded or open position. This obviates the need to turn the envelopes face down on the stage. Further, with the preferred composite tapes, the envelopes can be turned face down and lay flat on the stage with minimal adhesive transfer.

SUMMARY OF THE INVENTION

The present invention comprises an improved envelope for transparencies for overhead projectors, said envelope comprising a substantially rectangular pocket of transparent sheet material, said pocket having two longitudinal side edges connected by shorter side edges, said pocket being open at least along one side edge for insertion of a transparency, at least one opaque flap attached in a foldable manner along one of said side edges by means of a flexible adhesive tape, said flap having a folded and an unfolded position, said tape comprising a flexible polyester backing having a thickness of 15 micrometers or less, and attached on one surface thereof, an adhesive layer, wherein said tape has a flexibility measurement of not more than 2.5 grams, and a 180° peel adhesion of at least 100 grams per centimeter, wherein the flap, when unfolded, remains in the unfolded position, and when turned face down on an overhead projector stage will exhibit minimal adhesive transfer to said stage at the operating temperature of the overhead projector.

This invention also provides an adhesive tape suitable for use in an improved envelope for overhead transparencies, having at least one opaque flap, such tape comprising a flexible polyester material having a thickness of less than 15 microns, and coated on one surface of said backing is a flexible adhesive layer wherein said composite tape has a flexibility measurement of not more than 2.5 grams, and a 180° peel adhesion of at least 100 grams per centimeter, wherein said tape will exhibit minimal transfer to an overhead projector stage at the operating temperature of the overhead projector.

The term "adhesive tape" as used herein means an adhesive which is positioned on, or coated as a layer on, at least one major surface of a polyester substrate. The adhesive may be pressure-sensitive, heat-activatable, heat-bondable, or any other type of known adhesive. The tape may be premade and placed onto the envelope during construction thereof, or it may be made concurrently with the envelope, or after the envelope is constructed, by coating the chosen adhesive onto a polyester material which has already been placed in the envelope.

DESCRIPTION OF THE DRAWINGS

In FIG. 1, the envelope 1 comprises a pocket 2, which consists of two sheets 4, 5 of transparent plastic material which can hold a transparency, said sheets being joined together at least along one side or formed by folding a large sheet to form the faces of the envelope. Along one longitudinal side, the envelope may be provided with punched holes 6 to permit storage in a file, binder or the like. Two opaque, substantially rectangular elongated flaps 7, 8 are attached in a foldable manner to the outer side of one sheet 5 of the pocket or envelope. The flaps each have a portion adjacent to the attachment edge which is opaque 9, with the remainder being transparent.

DETAILED DESCRIPTION OF THE INVENTION

The improved envelopes of the invention comprise an adhesive tape having a polyester backing having a thickness of 15 micrometers or less, preferably from 5 micrometers to 10 micrometers. The backing may be any thermoplastic film forming polyester produced by condensing a dicarboxylic acid or a lower alkyl diester thereof, e.g., terephthalic acid, isophthalaic, phthalic 2,5-naphthalene dicarboxylic acid, succinic acid, adipic acid, and the like, with a glycol such as ethylene glycol, 1,3-propanediol, 1,4-butanediol, and the like. The polyester may also be a copolyester of any such acid and glycol. The preferred polyester is poly(ethylene terephthalate) for its clarity, durability and cost.

Useful adhesives for the adhesive layer of such tape are those having good adhesion to the polyester backing, and the envelope, and include acrylics, tackified or untackified, tackified rubber-based adhesives, urethanes, silicones and the like. They can be hot melt adhesives, solvent-based, water-based, or emulsion, E-beam or actinic radiation curable or moisture curable.

The thickness of the adhesive layer depends on such factors as the type of adhesive used and the type and thickness of the film backing, however, the thicknesses of the adhesive layer typically range from 2.5 micrometers to 100 micrometers, preferably from 5 micrometers to 75 micrometers, most preferably from 10 to 25 micrometers. While some of the preferred adhesives can be coated on the required backing up to 100 micrometers in thickness without causing excessive adhesive transfer, this thickness is generally not preferred from resource management and aesthetic perspectives.

At the preferred thickness range, the adhesive layer has a 180° peel adhesion of at least 100 grams per centimeter (under conditions specified, infra), for the flaps to remain securely attached to the edges of the pocket. When adhesives with lower peel adhesion values are used, the adhesive will tend to separate from the edges of either the main pocket or the flap after repeated opening and closing of the flaps and expose more of the adhesive layer for adhesive transfer to the stage if the flaps are placed face down.

The adhesives can be pressure-sensitive, heat activatable pressure-sensitive, or heat bonding with the pressure-sensitive and heat-activatable pressure-sensitive being preferred. Also useful are heat-set adhesives including thermoplastic and thermosetting resins, which have the advantages of good bonding strength to prevent separation of the adhesive, and are nontacky at the operating temperature of the overhead projector, so long as they meet the flexibility and peel requirements necessary. Useful pressure-sensitive adhesives possess good bonding and low creep properties, while remaining flexible, which is one requirement so that when the flap is in the unfolded position, there will be less tendency for the adhesive to creep onto the stage or other surface contacted. The thin backing of the tape and resultant flexibility provides a smaller exposed area when the flap is in the unfolded position. Minimal adhesive layer thickness also helps in minimizing amount of adhesive which is exposed when the flap is in the unfolded position. These factors, along with the adhesive properties substantially reduce the amount of adhesive transfer when compared to conventional products.

Other helpful procedures include detackifying the exposed adhesive edge along the fold line, coating variations and the like. Useful detackifying treatments include treating the exposed edges with E-beam or the addition of an appropriate chemical compound to either coat or react with the adhesive.

Preferred adhesives include acrylics and tackified rubber-based adhesives. For the preferred adhesives, a very thin layer of 10 micrometers can provide the required peel adhesion.

One preferred class of pressure-sensitive adhesives are acrylate adhesives. They can be monomers and/or oligomers such as (meth)acrylates, (meth)acrylamides, vinyl pyrrolidone and azlactones, as disclosed in U.S. Pat. No. 4,304,705, (Heilmann), Re 24,906 (Ulrich), and U.S. Pat. No. 4,181,752, (Martens). Such monomers include mono-, di-, or poly-acrylates and methacrylates.

Preferred acrylates are typically alkyl acrylates, preferably monofunctional unsaturated acrylate esters of nontertiary alkyl alcohols, the alkyl groups of which have from 1 to 14 carbon atoms. Included with this class of monomers are, for example, isooctyl acrylate, isononyl acrylate, 2-ethyl-hexyl acrylate, decyl acrylate, dodecyl acrylate, n-butyl acrylate, and hexyl acrylate. The alkyl acrylate monomers can be used to form homopolymers or they can be copolymerized with polar copolymerizable monomers. When copolymerized with strongly polar monomers such as monoolefinic mono- and dicarboxylic acids, hydroxyalkyl acrylates, cyanoalkyl acrylates, acrylamides or substituted acrylamides, the alkyl acrylate monomer generally comprises at least 75% of the polymerizable monomer composition. When copolymerized with moderately polar monomers such as N-vinyl pyrrolidone, acrylonitrile, vinyl chloride or diallyl phthalate, the alkyl acrylate monomer generally comprises at least 70% of the polymerizable monomer composition.

The pressure-sensitive adhesive typically contains at least one initiator to aid in polymerization of the monomers. Suitable initiators include thermally-activated initiators such as azo compounds, hydroperoxides, peroxides, and the like, and photoinitiators such as the benzoin ethers, substituted benzoin ethers, substituted acetophenones, substituted alpha-ketols such as 2-methyl-2-hydroxy-propiophenone, aromatic sulphonyl chlorides such as 2-naphthalene sulphonyl chloride, and photoactive oximes such as 1-phenyl-1,1-propanedione-2-(O-ethoxycarbonyl) oxime. Generally, the initiator is present in an amount of from 0.01 part to 3.0 parts based on 100 parts monomer weight.

The pressure-sensitive adhesive layer may also be crosslinked. Preferred crosslinking agents for acrylic pressure-sensitive adhesives are multiacrylates such as 1,6-hexanediol diacrylate as well as those disclosed in U.S. Pat. No. 4,379,201 (Heilmann et al.). Other useful crosslinking agents include those chromophore substituted-s-triazines taught in U.S. Pat. No. 4,330,590 (Vesley), and U.S. Pat. No. 4,329,384 (Vesley et al.). Each of the crosslinking agents is useful in the range of from 0.01% to 1% of the total weight of the monomers.

Useful heat activatable adhesives include thermoplastic and thermosetting resins. Another preferred class of adhesives is that of rubber-type adhesives. The adhesives comprise a rubber resin, which may be either a natural rubber or a synthetic elastomer such as styrene-butadiene and styrene-butadiene-styrene copolymers and hydrogenated copolymers thereof, polybutadiene, polyisoprene, polyisobutylene, butyl rubbers, polychloroprene, ethylene-propylene copolymer rubbers, ethylene-propene-diene rubbers, and the like. Mixtures of such rubber resins may also be used. Such resins are available commercially under such trade names as Kraton™ e.g., Kraton™ G1657, D1101, D1107, and 1118, all available from Shell Chemical Co., Stereon™, e.g., Stereon™ 840A, and 845A, and Duradene™ e.g., Duradene™ 710, 711, and 713, all available from Firestone Tire and Rubber, and those available from BF Goodrich under the tradename Hycar™, and the like.

Such rubber-type adhesives typically also contain a tackifying agent. Useful tackifying agents include rosin esters and rosin acids, mixed aliphatic/aromatic tackifying resins, polyterpene tackifying agents, and hydrogenated tackifying agents. Preferred tackifying agents include the aliphatic hydrocarbon resins, the polyterpene resins and the hydrogenated resins. Mixtures of tackifying agents may also be used.

Rubber-type adhesives may also contain a plasticizing agent including naphthionic oils, paraffinic oils, aromatic oils and mineral oils.

Useful commercially available adhesives include Findley "590-371", and "802-334"; "HL-2203-X", "HM-2703", "HL-7389-X", available from H. B. Fuller; and "70-7141", and "70-7254", available from National Starch. Any useful adhesive may also contain such conventional additives as pigments, antioxidants, fillers, and the like, So long as such additives do not render the adhesive outside the flexibility and peel ranges required.

The adhesive chosen must have good bonding to the film backing, either as provided or the surface of the film backing can alternately be treated either by corona treatment or chemical adhesion promoters to insure good bonding. The composite tape has a flexibility measurement of no more than 2.5 grams as measured infra, preferably no more than 1.6 grams. Preferred adhesives also have a 180° peel adhesion of at least 100 grams per centimeter, preferably at least 150 grams per centimeter; and a composite thickness of less than 90 micrometers, preferably less than 40 micrometers.

The flexibility measurement requirement can be as low as possible, but in practice, measurements of lower than 1 gram become difficult to test. A tape with very low flexibility numbers, or outside the testing range is useful if it has adequate peel, and adequate integrity needed for the equipment processing and handling. At measurements higher than 2.5 grams, the flaps are difficult to unfold and will tend not to remain in the opened or unfolded position and to spring back to the closed position.

The backing can also have low adhesion backsize coating thereon or any other treatment to facilitate unwinding from a roll, so long as such treatments do not render the tape outside the flexibility range.

The flaps are preferably made from materials that are capable of being overwritten to enable the lecturer to make notes thereon, including bond paper, paperboard, opaque films such as pigment filled polyester; polyvinylchloride; polyolefins including polyethylene and polypropylene; and other similar materials, with polyvinyl chloride being preferred.

The pockets can be made from any transparent polymeric sheet material including cellulose esters, polyesters such as polyethylene terephthalate, polyamides such as nylon, polyolefins such as polyethylene and polypropylene, polycarbonates, polyethers and polyvinyls such as polyvinylchloride. Polyesters are preferred, most preferably polyethylene terephthalate.

The transparent sheet material is generally colorless, but it can also be colored. Different colors can be used to identify different uses, to personalize, to better organize a presentation, or simply for aesthetics. Colors can be chosen to give a soothing effect to the senses or to help to cut down any glare from the overhead projector without reducing the quality of the projected image. Color can be introduced through printing, coating, or in the film making process.

Logos or other indicia can also be present on the transparent sheet material. Such logos or indicia can be highly colored for ease of viewing, or they can be less intense as part of the background.

The transparent sheet material can have borders in order to clearly frame and define an image window for emphasis of presentation. The border can be a thin line or a wide strip, coextensive with the edge or spaced a distance from it. The border can be along the top and bottom edges only, side edges only, or present along all edges. It can be printed directly onto the transparent sheet or can be a separate piece attached by any attachment means. The borders can be dramatically different from the central viewing window by being colored, differently colored or black, or simply a lightly shaded area to provide contrast.

The pockets comprise opposed rectangular faces which are separable at least along one side edge for insertion of the transparency therebetween. The phrase "along one side edge" includes embodiments where the flap is attached along and coextensive with the longitudinal side edge of the pocket, as well as those where they are spaced a distance from the same side edge as disclosed in U.S. Pat. No. 4,402,585, such that in the unfolded position the flap extends beyond and covers the longitudinal edge. In the folded position the flap exposes the side edge. Where desired, the flap can also be attached along the short side edge.

Holes can be punched along the side edge of the pocket to permit storage of these pockets in a binder, file or the like.

The term "opaque flap" as used herein, means a flap has optical properties which cause light blocking, light reflecting or light scattering. When an envelope having opaque flaps, containing a transparency, is placed on the stage of an overhead projector, the opaque flaps prevent transmission of the majority of light through the side edges of the projector stage to the screen. Such properties can aid in a presentation by providing improved viewing of the projected image. The opaque flap can scatter the light in a way that the majority does not reach the screen, thereby creating a sufficient contrast between the intensity of light coming through the transparency and the lesser intensity of light coming from the side edges of the stage, thus promoting easier viewing of the projected image.

The flap can also be colored if desired, e.g., to identify or organize a presentation, or for aesthetic reasons. The flaps may be similarly or differently colored to the transparent sheet material, and each other. The color(s) can be introduced as described for the transparent sheet material, likewise, legends such as logos or indicia can be added. The entire flap, whether white or colored, can be opaque, or a portion of the flap near the attachment edge can be opaque, i.e., prevent transmission of the majority of light while the remaining portion transmits a majority of light entering that portion, i.e., it may be transparent or translucent. When opened, such a flap can cover or mask any peripheral illumination along the edge, and cover any holes in the underlying pocket, while allowing the image to be viewed and copies to be made with the flap closed.

TEST METHODS

Flexibility Measurement

The flexibility of the adhesive tape is measured with a Sherr-Tumico tension gauge having a range of measurement from 0.6 to 6.0 grams of tensions. A driven platen is used to maintain a constant and reproducible speed of 30.5 cm/minute (12 inches/minute). Samples are measured using white polyvinyl chloride flaps having dimensions of 4.5 cm×29 cm and thickness of 120 micrometers. The flaps weigh 2.1 grams. The flap is attached to a pocket using the tape to be tested. The sample is placed, flap side up, on a flat surface with the flap opened at a 90° angle from the sleeve. The sample is set so that when the platen starts moving, the tension gauge arm will engage the flap by approximately 0.65 cm. (The flip extends 0.65 cm into the path of the arm,), and at a position 2.54 cm above the flap/pocket intersection. The tension gauge is mounted on the driven platen so that it is moving at 30.5 cm per minute when it engages the flap. The platen is started and the tension gauge moves horizontally until it engages the flap and forces it to open further. The maximum tension is read from the gauge after it clears the flap. The result is reported in grams. Results are comparable for flaps having a weight specified above. If testing is desired for flaps having other weights, the results should be specified in grams per unit weight or unit area.

180° Peel

Peel adhesion is measured using an SP-102B-3M90 Extended Capability Slip/Peel tester, marketed by IMASS, Inc. The instrument is set up as follows: platen speed of 30.5 cm/minute, averaging time selector set to 10 seconds, peak select set to kinetic, meter select switch to peak, speed range selector to SL, and range/zero switch to B. A sample is cut parallel to the tape so that the flap, tape and pocket are intact when testing a commercially available example. The tape is applied directly to either the flap or the pocket alone for all other samples. Results are specified as being peel from PET if from the pocket, PVC for peel from the flap or both.

To measure peel adhesion of the hinge to the pocket, the sample is secured to the platen with double coated tape and the flap is peeled from the pocket to a distance of 2.54 cm. The flap is attached to the load cell on the peel tester and the platen is started. As the platen moves, the flap is peeled from the pocket and the force is measured by the load cell and displayed in grams. Peel adhesion to the flap is measured by peeling the tape from the flap. Peel adhesion is reported in grams/cm, and represents the average of 4 measurements.

ADHESIVE TRANSFER TEST

A 3M Model 2150 Overhead Projector was used to observe adhesive transfer in the following manner:

The overhead projector was turned on and allowed to warm for 30 minutes. A 4 cm sample, cut perpendicular to the hinge, so that the hinge, pocket and flap interaction was intact, was placed on the stage, face down, with the flap in the open position. A cylindrical brass weight having a diameter of 3.8 cm and weighing 100 grams was placed and centered on open hinge and let stand for 1 minute. The sample was then pulled across the stage at a rate of 30.5 cm per minute (12 inches per minute) in such a direction that the flap was forced to open further to expose the adhesive. Three samples were tested unless otherwise noted. The result was reported as P/3 if no adhesive residue was left on stage, if adhesive residue was left on stage, the result was reported as F/3. The sample is deemed to be acceptable if two of three samples do not leave residue.

The following examples are meant to be illustrative only. Variations within the spirit of the invention are possible as understood by those skilled in the art. The scope of the invention is that contained in the claims.

EXAMPLES

Example 1

A pocket for overhead transparencies was made in the following manner. A hot melt pressure-sensitive adhesive, available as Findley 590-371 was coated by means of a Nordson Slot Nozzle Coater at a thickness of 18 micrometers onto a 9.0 micrometer polyethylene terephthalate (PET) film. The film had been previously slit to a width of 1.25 centimeters. The tape was applied to a transparent PET pocket. The flaps, made of TiO2 filled PVC film having dimensions of 4.5 cm×29 cm and thickness of 120 micrometers were attached to the pocket using the above tape. The finished pocket is then tested for 180° peel adhesion, adhesive transfer, and flexibility according to the methods described above and the test results were reported in Table 1.

Example 2

This envelope was made in the same manner as Example 1, except that the adhesive layer was an acrylate adhesive comprising 95.5 parts isooctyl acrylate (IOA) and 4.5 parts acrylic acid (AA), coated out of solvent (27% solids in ethyl acetate) at a dry thickness of 12.5 micrometers which was coated using a knife coater onto a 6 micrometer PET backing. The tape was then used to attach the flaps to the edge of the pocket. The tape was tested for peel, flexibility and adhesive transfer. The peel test was performed on a complete envelope rather than a cut sample as described above. The measurements are also reported in Table 1.

Examples 3–6

These were made in the same manner as example 2, except that different adhesive and backing thicknesses were used, as shown in Table 1. The peel, adhesive transfer and flexibility measurements were made, with the peel tests being performed on complete envelopes, and the results are shown in Table 1. Peel adhesion of example 5 was tested on the pocket.

Example 7

This envelope was made in the same manner as Example 1, except that the adhesive was an acrylate adhesive comprising 90 parts IOA, and 10 parts AA in ethyl acetate/toluene solvent at 29% solids. This was coated using a knife coater onto a 6 micrometer thick poly(ethylene terephthalate) backing to an adhesive thickness of 18 micrometers. The peel, adhesive transfer and flexibility data are included in Table 1.

Example 8C

This example was a commercially available Flip-Frame™ product, available from 3M, with an acrylate adhesive comprising 95.5 parts IOA and 4.5 parts AA, coated out of solvent (27% solids in a 70/30 mixture of heptane/isopropanol) at a coating weight of 32 g/m². The backing for the tape was a 130 μm thick rayon non-woven sheet. The envelope was tested for peel, adhesive transfer and flexibility, and the test results are also reported in Table 1.

Examples 9–12 and 13C

These were made in the same manner as example 7 except the different adhesive thicknesses were used. For example 13C, the adhesive thickness was outside the limits of the invention. These samples were also tested for peel, adhesive transfer and flexibility and the results reported in Table 1.

Examples 14–19

These samples were made in the same manner as Example 7 except the different adhesive thicknesses were used. These samples were also tested for peel, adhesive transfer and flexibility and the results reported in Table 2. In example 16, the peel adhesion was tested on the pocket.

Examples 20–23

These samples were made in the same manner as Example 1 except that different adhesive and backing thicknesses were used. The compositions are reported in Table 2. These samples were also tested for peel, adhesive transfer and flexibility and the results are also reported in Table 2.

Examples 24–27

These examples were made in a manner similar to Example 1, except that different adhesives were used. The compositions are reported in Table 3. These samples were also tested for peel, adhesive transfer and flexibility and the results are also reported in Table 3.

TABLE 1

| EXAMPLE | FLEXIBILITY (g) | BACKING THICKNESS (μm) | ADHESIVE THICKNESS (μm) | 180° PEEL (g/12.5 mm) PVC | 180° PEEL (g/12.5 mm) PET | ADHESIVE TRANSFER |
| --- | --- | --- | --- | --- | --- | --- |
| 1 | 0.9 | 9.0 | 18.0 | 682 | 616 | 3P/3 |
| 2 | 0.6 | 6.0 | 12.5 | 335 | 393 | 3P/3 |
| 3 | 1.1 | 9.0 | 18.0 | 311 | 316 | 3P/3 |
| 4 | 1.0 | 9.0 | 40.6 | 547 | 492 | 3P/3 |
| 5 | 1.0 | 9.0 | 5.0 | 190 | 217 | 2P/3 |
| 6 | 1.7 | 11.7 | 5.0 | — | — | 3P/3 |
| 7 | 0.7 | 6.0 | 18.0 | 410 | 359 | 3P/3 |
| 8-C | 4.1 | 130 | *** | 712 | 218 | 5F/5* |
| 9 | 1.0 | 9.0 | 15.0 | 299 | 295 | 2P/3 |
| 10 | 1.0 | 9.0 | 22.9 | 386 | 394 | 2P/3 |
| 11 | 0.8 | 9.0 | 12.5 | — | — | 3P/3 |
| 12 | 1.4 | 9.0 | 73.7 | 674 | 588 | 3P/3 |
| 13 | 1.0 | 9.0 | 100.0 | 1449 | 1382 | 3P/4** |

*5 samples were tested
**4 samples were tested
***Unable to determine actual thickness since some adhesive becomes embedded in backing coating weight: 32 g/m²

TABLE 2

| EX | ADHESIVE FORMULATION | FLEXIBILITY (g) | BACKING THICKNESS (μm) | ADHESIVE THICKNESS (μm) | 180° PEEL (g/125 mm) PVC | 180° PEEL (g/125 mm) PET | ADHESIVE TRANSFER |
|---|---|---|---|---|---|---|---|
| 14 | IOA/ACM** 21% (94/6) solid in ethylacetate/heptane | 1.0 | 9.0 | 15 | 314 | 302 | 3P/3 |
| 15 | IOA/ACM** 21% (94/6) solid in ethylacetate/heptane | 0.9 | 9.0 | 15 | 325 | 299 | 3P/3 |
| 16 | IOA/ACM** 21% (94/6) solid in ethylacetate/heptane | 1.8 | 11.7 | 2.5 | 171 | 149 | 2P/3 |
| 17 | 2-methylbutyl acrylate/AA (90/10) 40% solid in ethylacetate | 1.2 | 9.0 | 18 | 343 | 288 | 3P/3 |
| 18 | IOA/AA (98/2) 26% solid in ethylacetate | 1.0 | 9.0 | 22.5 | 407* | 342 | 2P/3 |
| 19 | Findley 590-371 | 0.8 | 9.0 | 45.7 | 1112 | 1020 | 3P/4+ |
| 20 | Findley 590-371 | 1.8 | 11.7 | 20.0 | 760 | 697 | 3P/4+ |
| 21 | Findley 590-371 | 1.8 | 11.7 | 5.0 | | | P/1++ |
| 22 | IOA/OA/SSS(87/12/1)*** | 1.1 | 9.0 | 20.0 | 220 | 239 | 3P/3 |

*Average of 3 only
**Acrylamide
***Isooctyl/N-(octyl)acrylamide/sodium styrene sulfonate
+4 samples were tested
++Only 1 sample was tested

TABLE 3

| EX | ADHESIVE FORM. | FLEXIBILITY (g) | BACKING THICKNESS (μm) | ADHESIVE THICKNESS (μm) | 180° PEEL (g/125 mm) PVC | 180° PEEL (g/125 mm) PET | ADHESIVE TRANSFER |
|---|---|---|---|---|---|---|---|
| 23 | H2104[1] | 1.4 | 9.0 | 29.1 | 1459 | 1333 | 3P/3 |
| 24 | INSTANT-LOK 34-2789[2] | 1.9 | 9.0 | 11.3 | 288 | 280 | 3P/3 |
| 25 | EASTOBOND A-747S[3] | 1.8 | 9.0 | 26.6 | 1158 | 1017 | 3P/3 |
| 26 | DURO-LAM 34-4295[2] | 2.4 | 9.0 | 11.3 | 435 | 111 | 3P/3 |

[1]Available from Findley Chemical
[2]Available from National Starch and Chemical Co.
[3]Available from Eastman Kodak

What is claimed is:

1. An improved envelope for transparencies for overhead projectors, said envelope comprising a substantially rectangular pocket of transparent sheet material, said pocket having two longitudinal side edges connected by shorter side edges, said pocket being open at least along one side edge for insertion of a transparency, at least one opaque flap having light scattering, light blocking or light reflecting properties such that a majority of light entering said flap is not transmitted therethrough, said flap being attached in a foldable manner along one of said side edges by means of a flexible adhesive tape, said flap having a folded an unfolded position, said tape comprising a flexible polyester backing having a thickness of less than 15 micrometers, and attached on one surface thereof, an adhesive layer, wherein said tape has a flexibility measurement of not more than 2.5 grams, and a 180° Peel adhesion of at least 100 grams per centimeter, said flap being capable of remaining in the unfolded position on an overhead projector stage with minimal adhesive transfer to said stage at the operating temperature of the overhead projector, having a decorative portion selected from the group consisting of borders, colored transparent sheet, colored flaps, and legends.

2. An envelope according to claim 1 wherein said decorative portion is selected from the group consisting of legends and borders.

3. An improved envelope according to claim 1 wherein said transparent sheet material has a border along at least one edge.

4. An improved envelope according to claim 3 having a border along each edge, thereby framing an image window.

5. An improved envelope according to claim 1 wherein said transparent sheet material is colored.

6. An improved envelope according to claim 1 wherein said transparent sheet material bears a legend thereon.

7. An improved envelope according to claim 1 wherein said flap is a color other than white.

8. An improved envelope according to claim 1 bearing multiple flaps wherein at least one of said flaps is a color other than white.

9. An improved envelope according to claim 8 where all of said flaps is a color other than white.

* * * * *